(12) United States Patent
Linck et al.

(10) Patent No.: US 7,592,029 B1
(45) Date of Patent: Sep. 22, 2009

(54) METHOD AND APPARATUS FOR SLICING SMALL CHEESE PORTIONS AND PREPARING CHEESE LOAVES FOR SLICING

(75) Inventors: Karl L. Linck, Kohler, WI (US); Michael A. Matharani, Depere, WI (US); Thomas R. Hiti, Plymouth, WI (US)

(73) Assignee: Sargento Foods, Inc., Plymouth, WI (US)

( * ) Notice: Subject to any disclaimer, the term of this patent is extended or adjusted under 35 U.S.C. 154(b) by 718 days.

(21) Appl. No.: 10/857,098

(22) Filed: May 28, 2004

Related U.S. Application Data

(60) Provisional application No. 60/474,162, filed on May 29, 2003.

(51) Int. Cl.
*A23C 19/00* (2006.01)
(52) U.S. Cl. .................. 426/518; 426/582; 83/862; 83/51; 83/932
(58) Field of Classification Search .................. 426/104, 426/582, 518; 99/537; 83/861–887, 51, 83/932; D1/121, 199
See application file for complete search history.

(56) References Cited

U.S. PATENT DOCUMENTS

| | | | | | |
|---|---|---|---|---|---|
| 707,528 | A | * | 8/1902 | Wolfinger | 249/52 |
| 1,943,587 | A | * | 1/1934 | Davis | 426/132 |
| 1,993,621 | A | * | 3/1935 | Parsons | 426/282 |
| 2,031,252 | A | * | 2/1936 | Criner | 426/76 |
| 2,111,910 | A | * | 3/1938 | Fisher | 83/620 |
| 3,255,717 | A | * | 6/1966 | Nervo | 426/497 |
| 3,492,132 | A | * | 1/1970 | Partyka | 426/383 |
| 3,887,719 | A | * | 6/1975 | Miller | 426/517 |
| 4,516,458 | A | * | 5/1985 | Pomerantz et al. | 83/651.1 |
| 4,599,928 | A | * | 7/1986 | Oker | 83/581.1 |
| 4,626,436 | A | * | 12/1986 | Bradley et al. | 426/289 |
| 4,681,000 | A | * | 7/1987 | Wolters | 83/862 |
| 5,069,914 | A | * | 12/1991 | Gagliardi, Jr. | 426/76 |
| 5,189,939 | A | * | 3/1993 | Allen, Jr. | 83/878 |
| 6,549,823 | B1 | * | 4/2003 | Hicks et al. | 700/159 |
| 6,652,894 | B2 | * | 11/2003 | Fleetham | 426/76 |
| 6,655,248 | B1 | * | 12/2003 | Johnson | 83/47 |
| 6,783,782 | B1 | * | 8/2004 | Larsen et al. | 426/76 |
| D495,463 | S | * | 9/2004 | Childress | D1/121 |
| D513,651 | S | * | 1/2006 | Cumpton et al. | D1/121 |
| D514,274 | S | * | 2/2006 | Cumpton et al. | D1/121 |
| D514,275 | S | * | 2/2006 | Cumpton et al. | D1/121 |
| D514,276 | S | * | 2/2006 | Cumpton et al. | D1/121 |
| D515,772 | S | * | 2/2006 | Cumpton et al. | D1/121 |
| D519,712 | S | * | 5/2006 | Cumpton et al. | D1/121 |
| D530,057 | S | * | 10/2006 | Cumpton et al. | D1/121 |

(Continued)

*Primary Examiner*—Drew E Becker
(74) *Attorney, Agent, or Firm*—Reinhart Boerner Van Deuren S.C.

(57) ABSTRACT

A cheese slice product and a method of making such a cheese slice product are disclosed wherein the cheese slice product contains an array of relatively smaller pieces which are linked together by one or more unslit connecting segments, with the method being directed to incising a standard cheese loaf and subsequently slicing the incised cheese slice loaf into such an array of smaller pieces. Incision patterns are applied to a typical cheese loaf prior to the loaf entering the slicer and line conveying systems. After slicing the incised cheese loaf, an unslit portion in each slice holds the multiple segments in the slice in the dimensional shape of the cross section of the loaf.

25 Claims, 10 Drawing Sheets

U.S. PATENT DOCUMENTS

| | | | |
|---|---|---|---|
| D537,606 S * | 3/2007 | Cumpton et al. | D1/121 |
| 2001/0028912 A1 * | 10/2001 | Kaiser et al. | 426/582 |
| 2002/0090427 A1 * | 7/2002 | Jordan | 426/144 |
| 2002/0166429 A1 * | 11/2002 | Pryor et al. | 83/77 |
| 2003/0017248 A1 * | 1/2003 | Gray | 426/589 |
| 2004/0025651 A1 * | 2/2004 | Bachman et al. | 83/13 |
| 2004/0151820 A1 * | 8/2004 | Harris | 426/582 |
| 2004/0231526 A1 * | 11/2004 | Childress | 99/386 |
| 2005/0170055 A1 * | 8/2005 | Gagliardi, Jr. | 426/518 |
| 2006/0042434 A1 * | 3/2006 | Cumpton et al. | 83/13 |
| 2007/0071877 A1 * | 3/2007 | Dear | 426/641 |

* cited by examiner

METHOD AND APPARATUS FOR SLICING SMALL CHEESE PORTIONS AND PREPARING CHEESE LOAVES FOR SLICING

CROSS-REFERENCE TO RELATED APPLICATION

This application claims priority of U.S. Provisional Patent Application No. 60/474,162, which is entitled "Method and Apparatus for Slicing Small Cheese Portions and Preparing Cheese Loaves for Slicing," and which was filed on May 29, 2003, the entirety of which application is hereby incorporated herein by reference.

BACKGROUND OF THE INVENTION

Field of the Invention

The present invention relates generally to cheese products, and more particularly to a cheese slice product containing an array of relatively smaller pieces which are linked together by one or more unslit connecting segments, and to a method of incising a standard cheese loaf in preparation for slicing such an array of smaller pieces therefrom.

A typical cheese loaf has standard height, width, and length dimensions. The height and width of slices produced when a typical loaf is cut along a cross section correspond to the dimensions of the loaf. Problems arise when cheese slices having smaller dimensions than the typical cheese loaf are desired, since relatively small slices of cheese are not produced easily or efficiently with known high speed slicing equipment. Typically, slicing and handling small sizes of sliced cheese during the manufacturing process is difficult due to individual slices not maintaining their position relative to the other slices after being sliced from a large cheese loaf.

One process for producing relatively small slices includes pre-dividing a typical cheese loaf into respective, aligned smaller loaves such that when a cut is taken along a cross section of the aligned smaller loaves, slices having a size corresponding to the dimensions of the smaller loaves are produced. However, difficulties arise during several of the production steps of such a process. For example, during the cutting of the larger loaf into smaller loaves, splitting of the larger loaf may occur. Further, while transporting aligned smaller loaves toward a slicing apparatus, it may be difficult or impossible to maintain proper alignment.

Additionally, after slicing through the aligned smaller loaves, the resultant smaller slices do not transport easily during the subsequent packaging steps of production and will likely require additional line labor to produce. The individual smaller pieces may come off the slicer in various misplaced configurations, and individual small slices may not maintain their position relative to the other small slices during the conveying and packaging procedures. When misaligned layers of small slices are stacked upon each other, the stack is frequently both unstable and unattractive. Additionally, it is highly inefficient to move such a stack from the slicer area through other manufacturing steps (e.g. checkweighing, accumulation, and indexing) without the stack falling apart, rendering it unacceptable as a consumer product.

In addition, the sliced cheese-conveying medium is typically composed of a series of belts such as flat belts, o-ring belts, diverter flights, or table top-style conveyors, and stacks of relatively small cheese slices do not easily convey over all transfers or conveying media styles without stack skewing or partial or whole stack loss. To improve conveying, pieces of interleaving paper may be inserted under the stack or under the stack and between slice rows to help stabilize the stack. This reduces the cumulative effect of misplacement, and aids in making the conveying stacks appear to the conveying mechanisms as a single larger piece rather than individual small piece stacks. However, this practice yields inconsistent results.

It is accordingly the primary objective of the present invention that it facilitate the production of the smaller cheese segments which are increasingly desired by the consuming public. It is a related objective of the present invention that it provide cheese slices having a smaller segment size which may be manufactured on a large scale without experiencing the problems previously encountered in the manufacture of such small slice segments. It is yet another objective of the present invention that it be capable of producing smaller cheese slices in any of the variety of different shapes which may be desired by the consuming public.

It is a further objective of the present invention that the smaller cheese segments be capable of manufacture on a large scale, fully automated production basis not requiring additional labor which could add significantly to the cost of manufacture. It is a still further objective of the present invention that the smaller cheese segments be producible in precise and uniform sizes, thereby ensuring a high level of product quality suitable to a premium cheese product. It is another related objective of the present invention that it be susceptible to producing the small slice segments from standard size cheese loaves without requiring nonstandard sizes or resulting in waste.

The apparatus used to produce the cheese slices of the present invention must be of construction which is both dependable and durable, and it should also produce consistent product with little or no adjustment or maintenance required throughout its operating lifetime. In order to enhance the market appeal of the smaller size cheese slices of the present invention, they should also be of manufacturing cost comparable to conventional cheese slices to thereby afford them the broadest possible market. Finally, it is also an objective that all of the aforesaid advantages and objectives of the smaller cheese slices be achieved without incurring any substantial relative disadvantage.

SUMMARY OF THE INVENTION

The present invention offers a solution to the above-noted problems by providing a unique cheese slice comprising an array of desired smaller pieces which is sliced from a cheese loaf having standard dimensions. The array retains the conveying characteristics of a larger slice, and the loaf retains characteristic slicing qualities.

The invention encompasses an apparatus and a method for partially incising a cheese loaf into at least two segments wherein the segments are joined by at least one unslit portion.

The invention also encompasses a cheese loaf having a longitudinal axis extending along its length, and at least one planar incision extending parallel to the longitudinal axis. The planar incision defines two loaf segments which are joined by an unslit portion. The planar incision extends from the exterior of the cheese loaf inwardly toward, but not completely to, either an oppositely disposed outer surface or an opposing planar incision, thereby forming loaf segments each having a cross section in the size and shape of a desired array slice.

The present invention further encompasses a sliced cheese product wherein an individual slice according to this invention comprises an array of at least two smaller portions. The sliced cheese product includes at least one incision defining the array of at least two relatively smaller portions, a selected relatively smaller portion being readily separable from the whole by the end consumer.

To accomplish the objectives of the present invention, incision patterns, which will be hereinafter illustrated, are applied to a typical cheese loaf prior to the loaf entering the slicer and line conveying systems. Preferred incision patterns act to partially incise a loaf along at least one generally longitudinal plane. The unslit portion defines a link between the loaf segments, which link initially holds the loaf segments in a generally unitized cheese loaf construction. After slicing the cheese loaf, the unslit portion holds the unitized slice array in the dimensional shape of the cross section of the loaf.

The unitized slice removed from the slicer includes an array of smaller pieces each being connected to at least one adjacent piece. The unslit portion holds the array of smaller pieces in a configuration that is easily handled by the subsequent processing apparatuses. The unitized cheese slice array readily fragments into its smaller segments when severed from the whole by a consumer who breaks the unslit portion.

A method of preparing loaves of cheese for slicing into the unitized cheese slice arrays described preferably includes use of a rotary cutter instead of the known methods of cheese cutting which use wires or blades that are intended to cut all the way through a cheese block to produce smaller portions. In contrast, the product and method of the present invention involves cutting partially through a cheese block to produce the effects described above. Cutters used in the present invention are necessarily positioned precisely to control the depth of incision.

When a slice array having four segments is desired, the incising blades preferably include two pairs of opposed, spaced apart incising blades. The incising blades are preferably spaced precisely to define a predetermined gap between each pair of blades. As a cheese loaf is passed between the spaced-apart incising surfaces, the predetermined gaps defines the mentioned unslit portion. Either single or multiple blades may be configured in any manner necessary to produce a predetermined incision pattern in the cheese loaf. The incision defines individual smaller pieces of a predetermined unitized cheese slice array configuration.

It may therefore be seen that the present invention facilitates the production of the smaller cheese segments which are increasingly desired by the consuming public. The smaller segment size cheese slices of the present invention may be manufactured on a large scale without experiencing the problems previously encountered in the manufacture of such small slice segments. The smaller segment size cheese slices of the present invention may be produced in any of a wide variety of different shapes which may be desired by the consuming public.

The smaller segment size cheese slices of the present invention are capable of manufacture on a large scale, fully automated production basis which does not require additional labor which would otherwise add significantly to the cost of manufacture. The smaller segment size cheese slices of the present invention are producible in precise and uniform sizes, thereby ensuring a high level of product quality suitable to a premium cheese product. The smaller segment size cheese slices of the present invention may be produced from standard size cheese loaves without requiring nonstandard sizes or resulting in waste.

The apparatus used to produce the cheese slices of the present invention is of a construction which is both dependable and durable, and it will also produce consistent product with little or no adjustment or maintenance required throughout its operating lifetime. The smaller size cheese slices of the present invention are also of manufacturing cost comparable to conventional cheese slices to enhance their market appeal and to thereby afford them the broadest possible market. Finally, all of the aforesaid advantages and objectives of the smaller cheese slices of the present invention are achieved without incurring any substantial relative disadvantage.

DESCRIPTION OF THE DRAWINGS

These and other advantages of the present invention are best understood with reference to the drawings, in which.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1A:
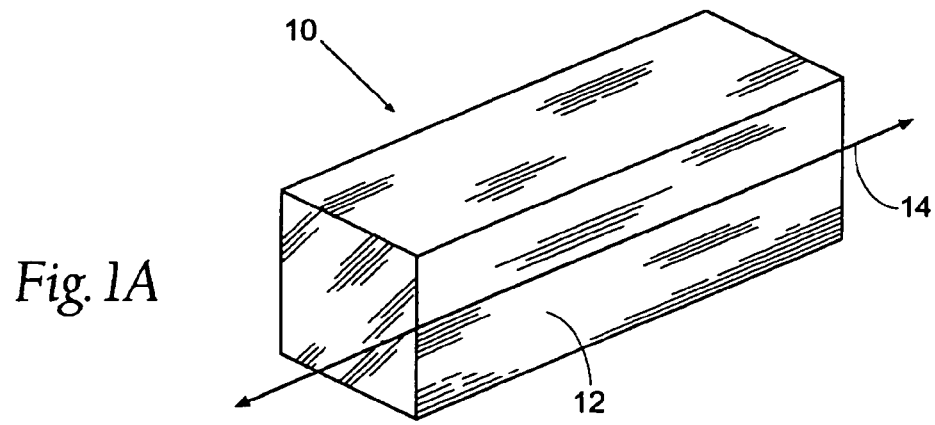
FIG. 1A is a perspective view of a typical rectangular cheese loaf to be used with the present invention.

Referring to the drawings, wherein like numerals represent like elements throughout the figures, a loaf of cheese is generally designated by the reference numeral 10. The cheese loaf 10 may be formed from any known natural cheese or process cheese product, including, by way of example, cheddar, provolone, Swiss, or the like. As may be seen particularly in FIG. 1A, the cheese loaf 10 is a rectangular solid with a square cross section, and has an exterior surface 12 and a longitudinal axis 14.

Figure 1B:
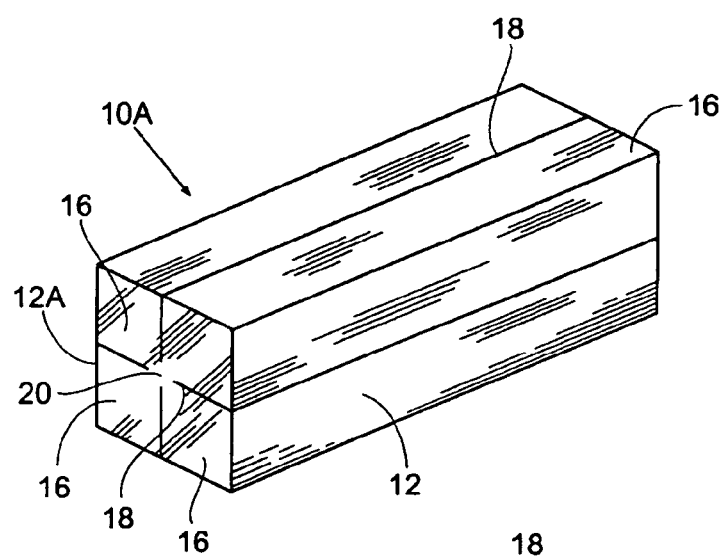
FIG. 1B is a perspective view of the cheese loaf of FIG. 1A longitudinally incised according to the present invention.

Referring now to FIG. 1B, the cheese loaf 10 of FIG. 1 has been incised to form an incised cheese loaf 10A according to the present invention. The incised cheese loaf 10A includes four longitudinally-extending planar incisions 18. As may be seen, the planar incisions 18 are located in the four long faces of the exterior surface 12 and extends inwardly from the exterior surface 12 toward, but not completely to, a longitudinally-extending center line extending through the length of the incised cheese loaf 10A.

But for the face that the planar incisions 18 do not extend to the center line, the incised cheese loaf 10A would be sliced into four equal loaf segments 16 which are each rectangular solids having the same length as that of the cheese loaf 10. The four loaf segments 16 are held together by an unslit portion 20, which acts as a link between the loaf segments 16 and initially holds them in a generally unitized incised cheese loaf 10A construction.

Figure 1C:
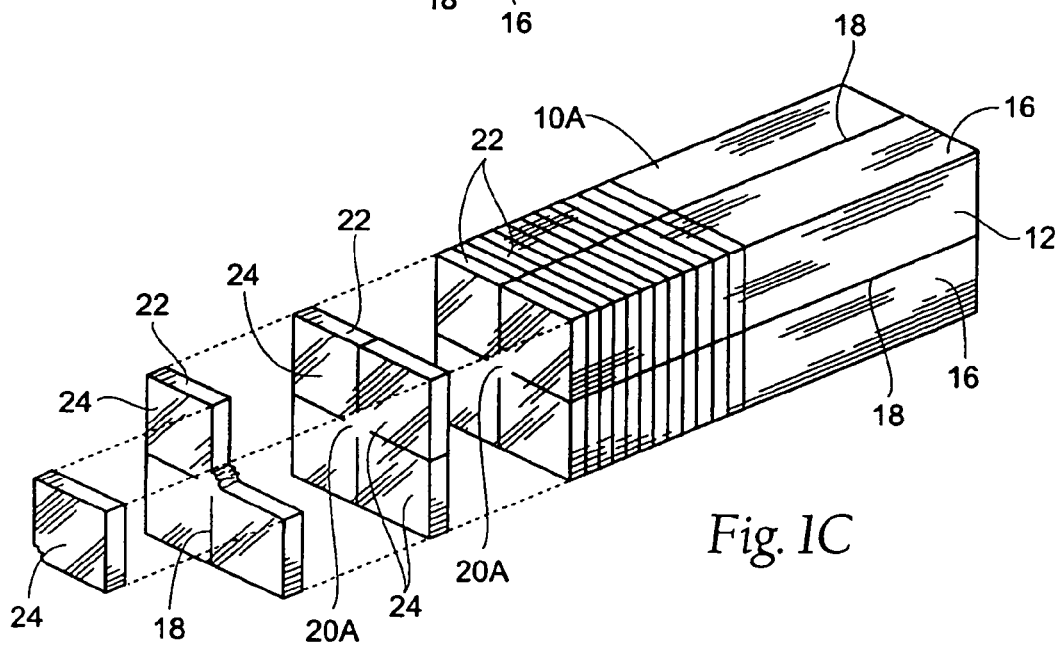
FIG. 1C is a perspective view of the cheese loaf of FIG. 1B sliced into an array of cheese slices, and also shown one segment which has been separated from its cheese slice.

Referring next to FIG. 1C, the incised cheese loaf 10A containing the four planar incisions 18 is sliced longitudinally into a plurality of cheese slices 22, each of which cheese slices 22 has the distinctive configuration shown. The array of cheese slices 22 according to the present invention will include at least two segments 24, with four segments 24 being shown in the embodiment illustrated in FIGS. 1B and 1C. As may be seen, the segments 24 are preferably linked by an undisturbed attachment portion 20A. The attachment portion 20A of the each cheese slice 22 connects four adjacent segments 24 in a configuration that will present to subsequent processing and handling apparatus as a single unitized cheese slice. It will be appreciated that each cheese slice 22 may be easily separated into smaller segments 24 as required by an end user.

As mentioned earlier, an aim of the invention is to give slicer and line conveying systems no apparent difference between large slices (slices the size of the entire cheese slice 22) and small slices (slices the size of the segments 24). The cheese slice 22 shown in FIG. 1C may be handled by conveying components (not shown herein) and a slicer (also not shown herein) as essentially the same as slices having similar outer dimensions, but without the planar incisions 18 separating the cheese slices 22 into segments 24. The cheese slice 22 will present the same dimensions and handling characteristics (e.g. dimensional attributes, center of gravity, belt transference) to conveying components and a slicer as an unincised slice (not shown).

Figure 1D:
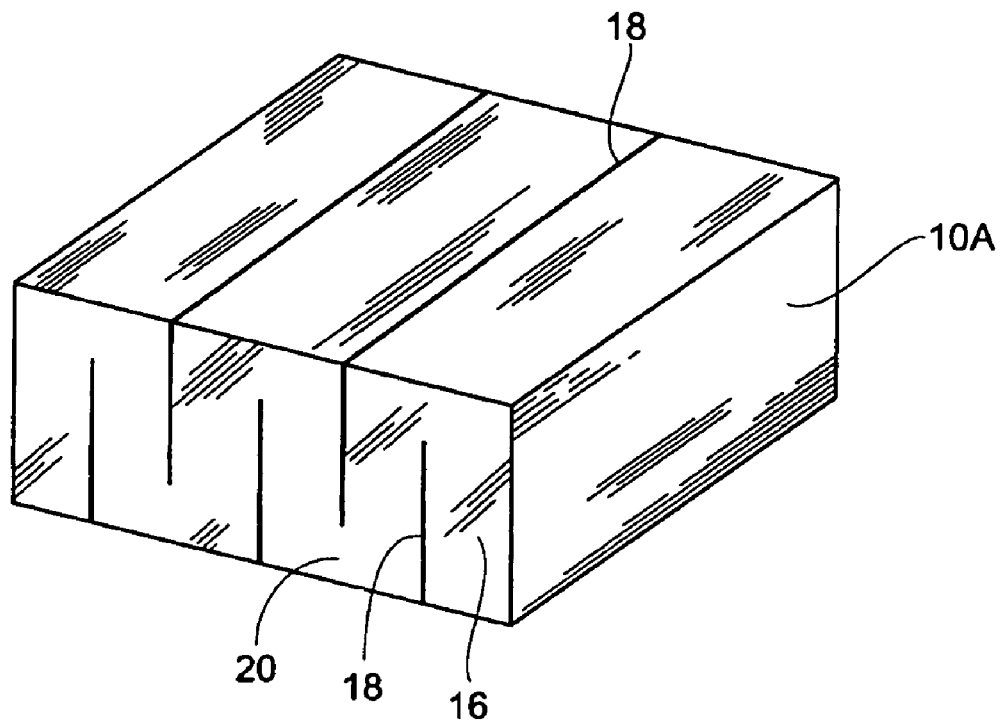
FIG. 1D shows perspective views of cheese loaves with two alternative incision patterns.
Figure 1D:
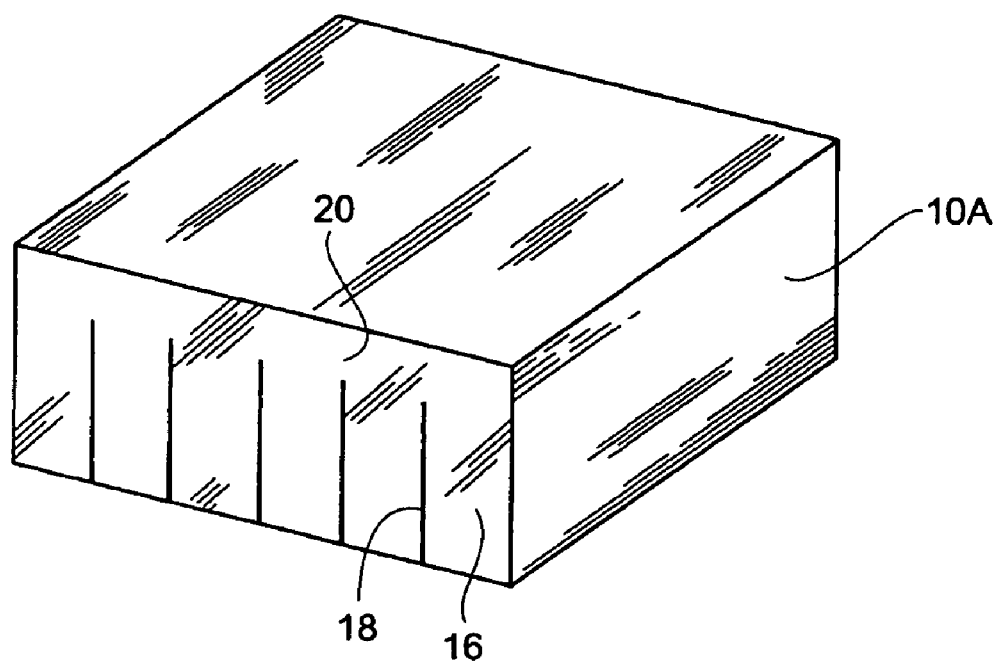

Two other incision patterns illustrated in FIG. 1D, by way of additional examples, may be applied to cheese loaves 10 in accordance with the method and apparatus of the present invention for similar results, depending of course on the size and shape of initial cheese loaf and the size of cheese segments desired. Both of the cheese loaves 10 illustrated in FIG. 1D have rectangular rather than square cross-sections, and it is desired to form cheese slices having six rectangular segments of equal size each having a rectangular configuration as long as the cheese loaves 10 shown in FIG. 1D are high. The two different incision patterns illustrated in FIG. 1D are both designed to produce incised cheese loaves 10A which may be sliced into cheese slices which will have the six rectangular segment configuration. Another possible incision pattern, which is not illustrated herein, would be to cut a plurality of planar incisions into a cylindrical cheese loaf, each planar incision ending sort of a longitudinal centerline, with cheese slices thereby containing a plurality of pie-shaped segments connected together with an attachment portion at the center of each slice.

It will be appreciated by those skilled in the art that the planar incisions 18 must leave an unslit portion 20 of sufficient size to hold the loaf segments 16 together during the subsequent processing of the incised cheese loaf 10A into slices. Additionally, the attachment portion 20A in the cheese slices 22 must be of sufficient size to hold the segments 24 of each cheese slice 22 together during subsequent handling and packaging processing. It has been determined that the unslit portion 20 of the incised cheese loaf 10A or the attachment portion 20A of the cheese slices 22 should be between approximately three-sixteenths of an inch long and three-quarters of an inch long, although the exact length will vary depending on the type of cheese and its characteristics (shorter lengths in softer cheeses and longer lengths in harder or brittle cheeses). Preferably, the unslit portion 20 or the attachment portion 20A is between one-quarter of an inch long and one-half of an inch long.

The incised cheese loaf 10A shown at the top of FIG. 1D has three planar incisions 18 extending upwardly from the bottom of the cheese loaf which alternate with two planar incisions 18 extending downwardly from the top of the cheese loaf, thereby producing six loaf segments 16 each having a rectangular cross-section as long as the incised cheese loaf 10A is high. The six loaf segments 16 are held together by five unslit portions located between each pair of loaf segments 16. The incised cheese loaf 10A shown at the bottom of FIG. 1D has five planar incisions 18 extending upwardly from the bottom of the cheese loaf, thereby producing six loaf segments 16 each having a rectangular cross-section as long as the incised cheese loaf 10A is high. The six loaf segments 16 are held together by five unslit portions located between each pair of loaf segments 16.

Each of the incised cheese loaves 10A shown in FIG. 1D may be sliced into arrays of slices 22 (not shown in FIG. 1D) presenting a similar appearance to slicer and line conveying systems as a stack made of large slices (slices the size of the entire rectangular cross-section of the incised cheese loaves 10A). The actual pattern and depth of the planar incisions 18 are dependent on the type of cheese used, consumer preference, line performance, and final segment size desired. It will be appreciated that each cheese slice may be easily separated into smaller segments as required by an end user.

The apparatus and method for incising the cheese loaves 10 in the manner described above with reference to FIGS. 1A, 1B, and 1C, are shown and described with reference to FIGS. 2-11. As may be seen, a preferred loaf incising apparatus 30 preferably includes at least one rotary incising blade 32, with four such rotary incising blades 32A, 32B, 32C, 32D being shown (see particularly FIG. 3) for making the planar incisions 18 (shown in FIG. 1B) in a cheese loaf 10 (also shown in FIG. 1B) having a square cross-section. Previously known methods of cheese cutting included the use of wires or blades (not shown herein) that are intended to cut all the way through a cheese loaf. While it is conceivable to use various other mechanical cutting devices to produce the incised cheese loaf 10A of the present invention, the rotary incising blades 32A, 32B, 32C, 32D shown are preferred.

Figure 3:
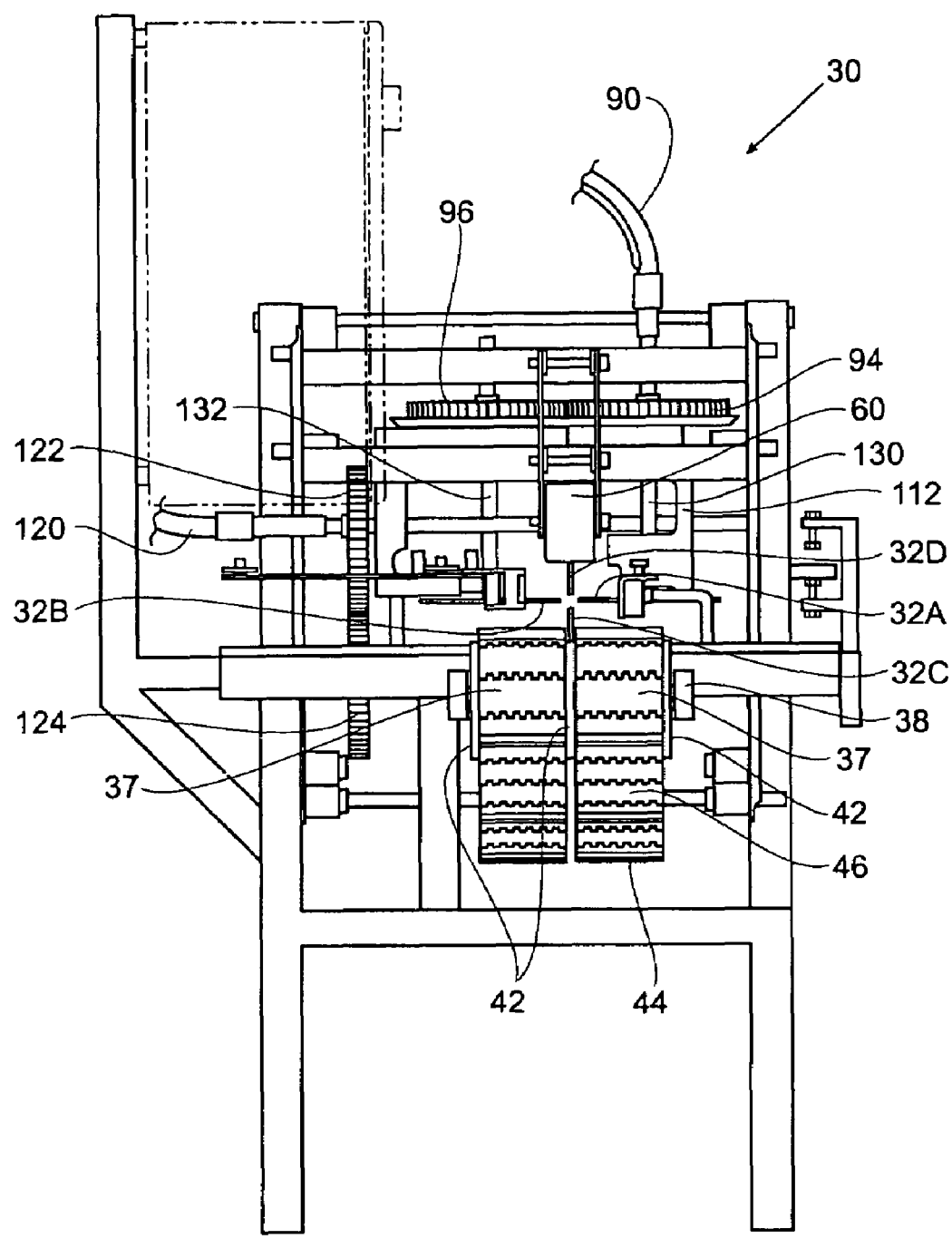
FIG. 3 is an end plan view of the loaf incising apparatus illustrated in FIG. 2, showing an incising area which is defined by two pairs of spaced apart incising rotary blades.
Figure 4:
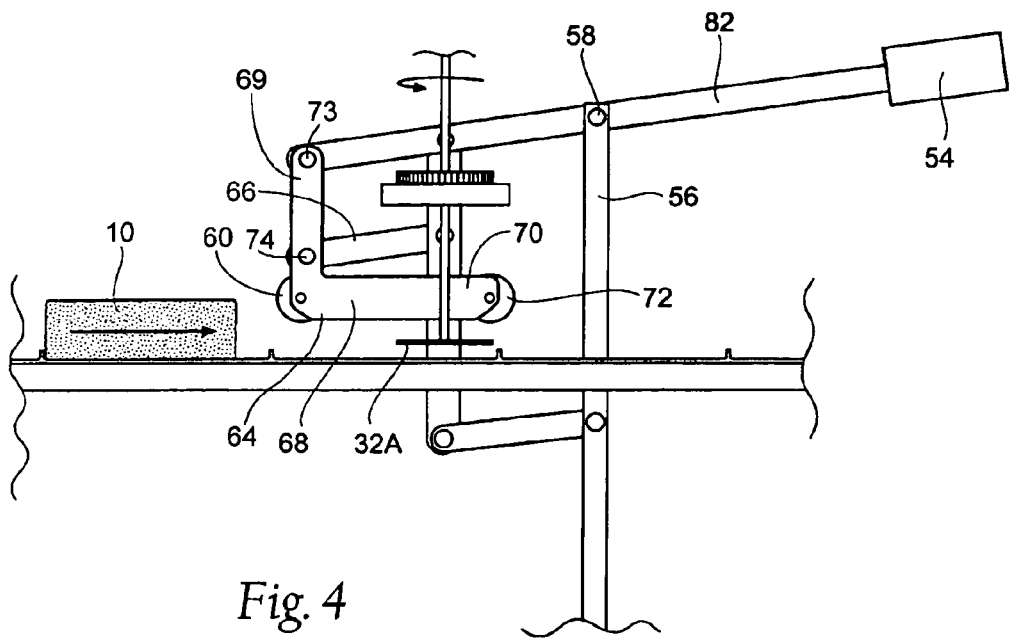
FIG. 4 is a fragmentary side view of the loaf incising apparatus illustrated in FIGS. 2 and 3, showing a standard cheese loaf moving in the direction of the horizontally disposed rotary blades.
Figure 5:
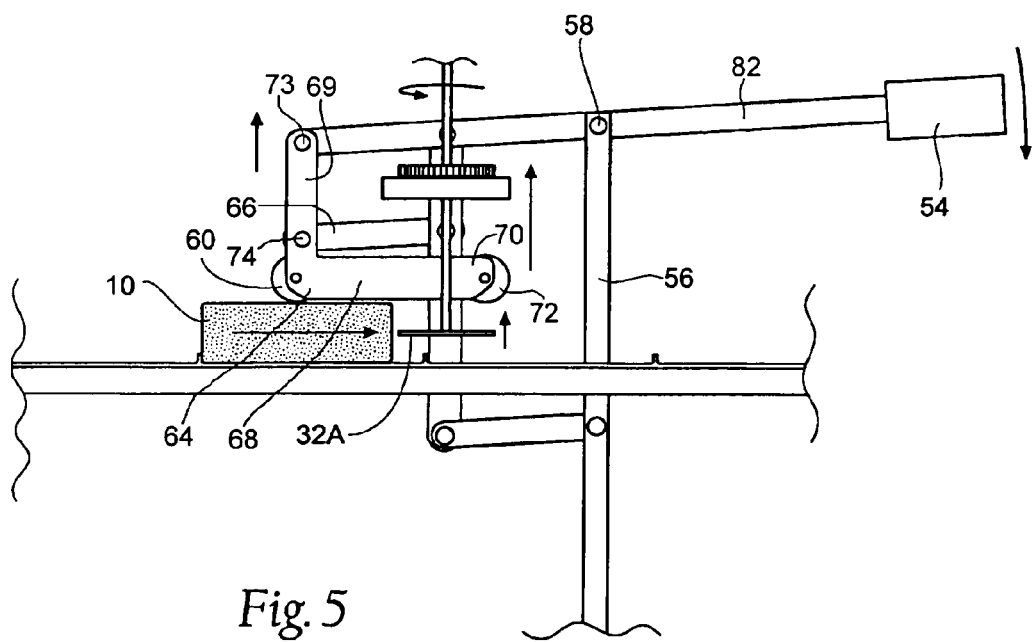
FIG. 5 is a fragmentary side view similar to that of FIG. 4, but showing a cheese loaf engaging a guide roller, thereby moving a centering mechanism and attached horizontally disposed incising rotary blade to a predetermined position to incise the loaf at its midpoint.
Figure 6:
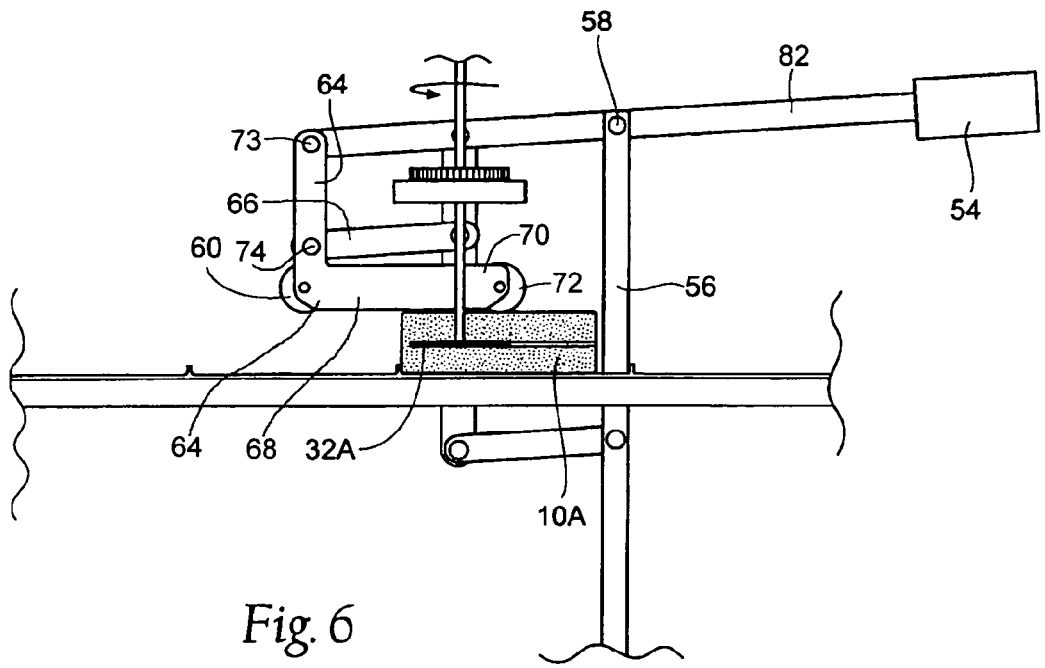
FIG. 6 is a fragmentary view, similar to those of FIGS. 4 and 5, but showing the aligned incising rotary blade partially incising the cheese loaf.
Figure 7:
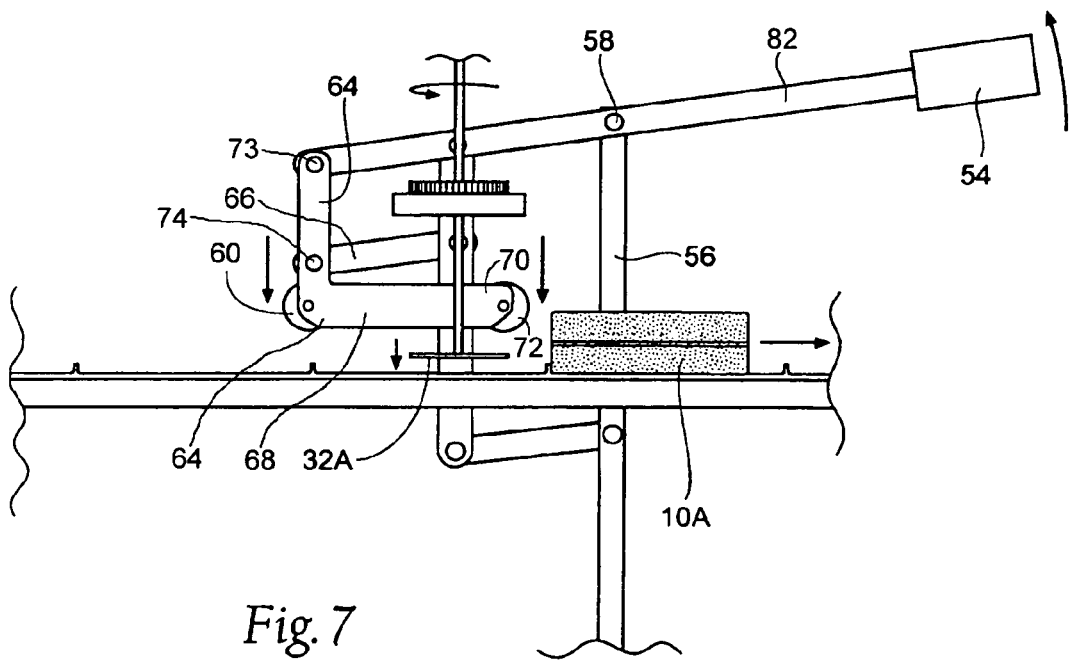
FIG. 7 is a fragmentary view, similar to those of FIGS. 4-6, but showing the incised cheese loaf moving away from the incising rotary blade and the centering mechanism returning to its first operating position.

As may be seen particularly in the view of FIG. 3, the rotary incising blades 32A and 32B, which are positioned horizontally, and the rotary incising blades 32C and 32D, which are positioned vertically, are necessarily positioned precisely to control the depth of the planar incisions 18, thereby controlling the dimension of the unslit portion 20 (shown in FIG. 1B). The rotary incising blades 32A, 3B, 32C, and 32D are preferably spaced precisely such that as a cheese loaf 10 is passed therethrough, and planar incisions 18 of predetermined depth are made, an unslit portion 20 (also shown in FIG. 1B) having predetermined dimension is also concurrently formed.

It will be understood by those skilled in the art that the multiple rotary incising blades 32A, 32B, 32C, and 32D may be configured in any manner necessary to produce the desired predetermined planar incisions 18. For instance, with minor modification to the components supporting and powering the rotary incising blades 32A, 32B, 32C, and 32D the invention disclosed and discussed herein, the planar incisions 18 could be formed to create loaf segments 16 (also shown in FIG. 1B) which, when sliced, will contain segments 24 (also shown in FIG. 1B) which conform in size to conventionally sized and configured crackers (not shown herein).

Figure 2:
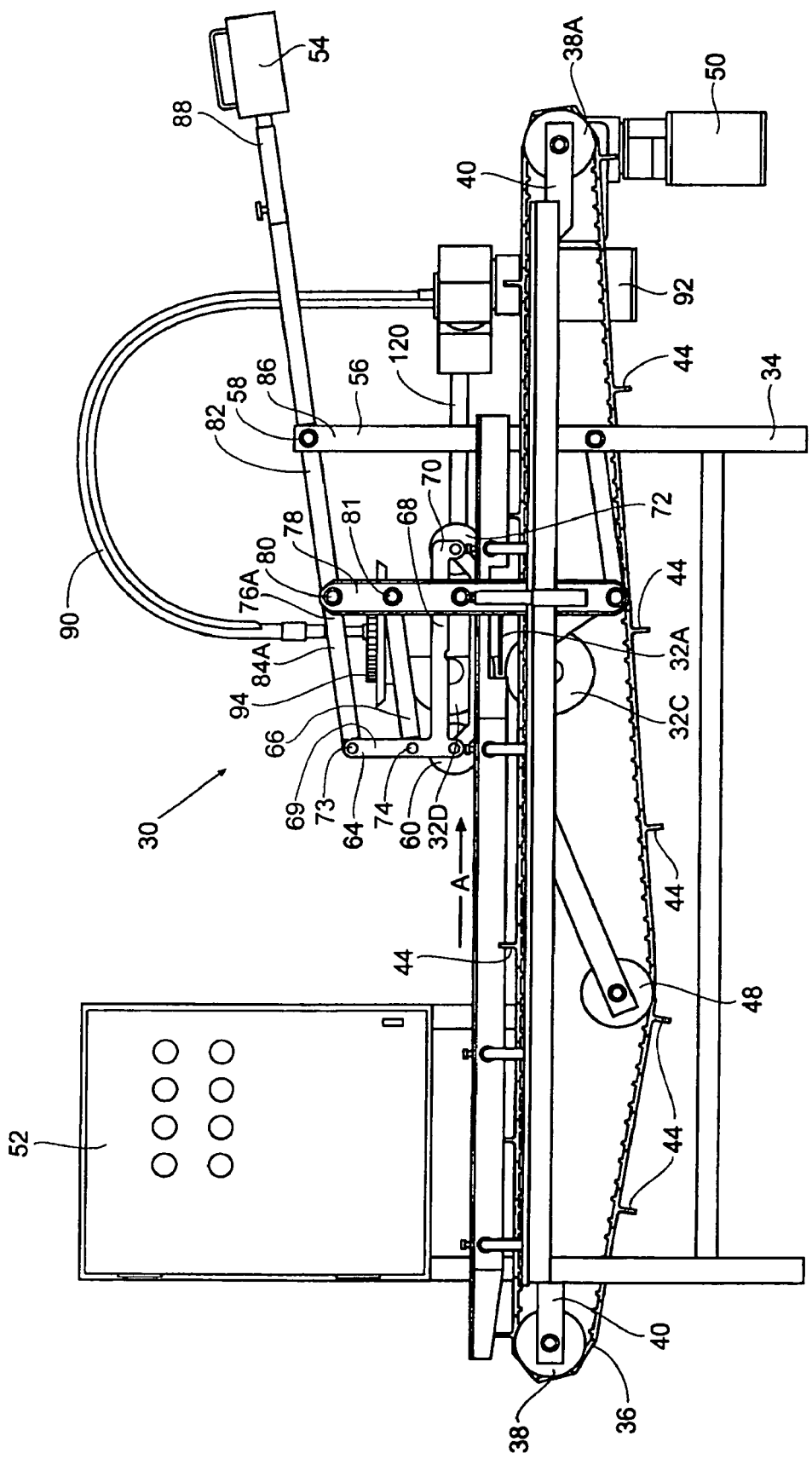
FIG. 2 is a side plan view of a loaf incising apparatus which is constructed according to the teachings of the present invention.

Referring now primarily to FIG. 2, the various components of the preferred loaf incising loaf incising apparatus 30 of the present invention may be described. The loaf incising apparatus 30 includes a stationary, table-like support 34 which includes a continuously operating split conveyor 36 divided into two parallel belt sections 37 (best shown in FIG. 3) which move the cheese loaf 10 during incising. The belt sections 37 are spaced apart to accommodate the vertical rotary incising blade 32C positioned therebetween. The vertical incising action will be later described in connection with FIGS. 8-11.

The split conveyor 36 is supported on rollers 38 and 38A, which are suspended between oppositely disposed, laterally extending, support arms 40. The roller 38A is conventionally toothed to engage and drive the split conveyor 36. As may be particularly seen in FIG. 3, the rollers 38 and 38A may preferably include upstanding flanges 42 located on the outer sides of the belt sections 37 and intermediate the two belt sections 37. These upstanding flanges 42 guide the belt sections 37 and provide the desired spacing therebetween.

The belt sections 37 of the preferred embodiment further include spaced-apart flights or lugs 44 extending from the top sides thereof to facilitate moving the cheese loaves 10 toward the rotary incising blades 32A, 32B, 32C, and 32D. The flights 44 may be integrally formed with some of the individual conveyor links 46 in the belt sections 37. Tensioning of the split conveyor 36 is preferably achieved by use of a weighted idler roller 48. The split conveyor 36 is driven by a variable speed motor/speed regulator 50, with the loaf incising apparatus 30 being controlled by known motor control units housed in an enclosure 52.

Although the loaf incising apparatus 30 accepts a variety of sizes and dimensions of cheese loaves 10, size variations are common among individual cheese loaves 10. This inconsistency can cause unwanted variations in the precision of incision placement relative to individual cheese loaves 10. To maintain a precise planar incision 18 depth and to maintain uniform unslit portions 20, there is provided a mechanism for centering the rotary incising blades 32A, 32B, 32C, 32D relative to cheese loaves 10. As may be seen, the loaf incising apparatus 30 is supplied with both vertical and horizontal mechanisms for centering the rotary incising blades 32A, 32B, 32C, and 32D. The centering mechanism for the horizontal rotary incising blades 32A and 32B and its operation is best shown in FIGS. 2 and 4-7, while the centering mechanism for the vertical rotary incising blades 32C and 32D centering mechanism is best shown in FIGS. 8-11.

Referring now to FIGS. 2 and 4-7, it may be seen that a support arm 82 is pivotally mounted near its midpoint at a pivot point 58 located at the top end of a stationary upright member 56, which itself is mounted on the table-like support 34. The support arm 82 has a counterweight 54 mounted at a first end thereof (shown on the right side in FIGS. 2 and 4-7). An L-shaped support member 64 includes a generally horizontal arm 68 (the base of the "L") and a generally vertical arm 69 (the leg of the "L"). The L-shaped support member 64 is pivotally mounted at the distal end of the horizontal arm 68 to a second end of the support arm 82 (the end opposite the counterweight 54) at a pivot point 73.

Also mounted from the support arm 82 is a blade locator bar 78, which is pivotally mounted from the support arm 82 at a pivot point 80 which is located halfway between the pivot point 58 and the pivot point 73 on the support arm 82. The blade locator bar 78 is supported on the table-like support 34 for movement generally up and down, and will raise and lower the height of the horizontal rotary incising blade 32B as it moves up and down, respectively.

The L-shaped support member 64 is also supported for movement by a link member 66 which extends between the L-shaped support member 64 and the blade locator bar 78. The link member 66 is pivotally attached at one end thereof to the vertical arm 69 of the L-shaped support 64 at a pivot point 74 which is located at an intermediate location on the vertical arm 69. The other end of the link member 66 is pivotally attached to the blade locator bar 78 at a pivot point 81 which is located at an intermediate location on the blade locator bar 78.

It will be noted that the distance between the pivot point 73 and the pivot point 74 is approximately the same as the distance between the pivot point 80 and the pivot point 81. Likewise, the distance between the pivot point 73 and the pivot point 80 is approximately the same as the distance between the pivot point 74 and the pivot point 81. The relative positions of the linkages are thereby maintained in parallel relationship to provide a generally parallelogram configuration. This configuration is maintained as the locator bar 78 and the horizontal rotary incising blade 32B are raised or lowered by the action of the L-shaped support member 64. Although it is not shown in the same level of detail in the drawings, a similar mechanism is used on the other side of the loaf incising apparatus 30 to raise and lower the horizontal rotary incising blade 32A.

A cheese-engaging roller 60 is rotatably mounted on the L-shaped support member 64 (and on a similar member on the other side of the loaf incising apparatus 30) at the corner of the "L." The cheese-engaging roller 60 functions to initially engage an incoming cheese loaf 10 moving in the direction of the horizontal arrow (labeled "A" in FIG. 2), thereby detecting the height of the incoming cheese loaf 10. As an individual cheese loaf 10 engages the cheese-engaging roller 60, the height of the cheese loaf 10 is translated via the mechanism described above to center the horizontal incisions. The horizontal arm 68 (and a similar member on the other side of the loaf incising apparatus 30) has at its distal end 70 a roller 72 of similar size as the cheese-engaging roller 60, which serves to maintain the position of the horizontal rotary incising blades 32A and 32B respective to the cheese loaf 10 during incising.

Figure 12:
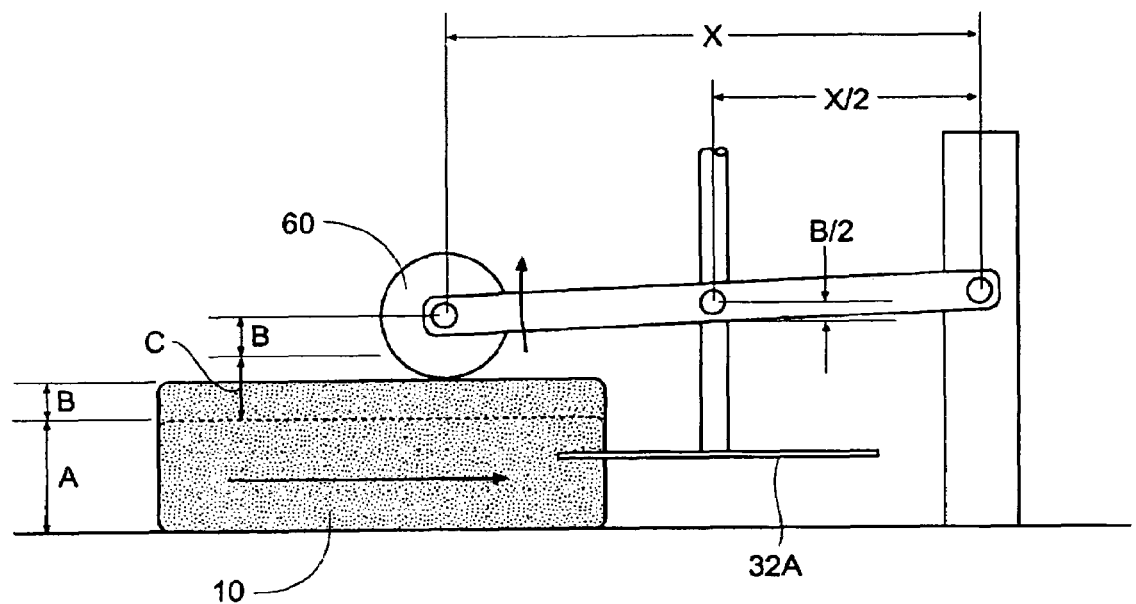
FIG. 12 is a somewhat schematic side view showing the mechanism for centering the horizontal incising blade relative to a cheese loaf as a cheese loaf travels in the direction of the arrow.

As mentioned above, the blade locator bar 78 is located intermediate the pivot point 58 and pivot point 73. It is preferred that the pivot point 80 connecting the blade locator bar 78 to the support arm 82 be positioned at a point halfway between the pivot point 58 and pivot point 73 such that when the cheese-engaging roller 60 is moved vertically a predetermined distance by the engagement of a cheese loaf 10, so the horizontal rotary incising blades 32A are moved half the distance, thus centering the horizontal rotary incising blades 32A relative to the cheese loaf 10. A somewhat schematic view showing the principle of this operation is illustrated in FIG. 12.

As best shown in FIG. 2, the first end of the support arm 82 (the end not connected to the L-shaped support member 64) is extended outwardly and carries the counterweight 54. Location of the counterweight 54 may be adjusted relative to the first end of the support arm 82 to adjust a counterbalancing moment arm. An adjustment mechanism 88, which is schematically illustrated in FIG. 2, is provided to make this adjustment.

With respect to the horizontal rotary incising blades 32A and 32B and as seen particularly in FIGS. 2 and 3, it may be observed that a flexible shaft 90, which is connected to a variable speed power source 92, drives a drive gear 94. As seen particularly in FIG. 3, the drive gear 94 is intermeshed with a mating gear 96, and the drive gear 94 and the mating gear 96 together transfer rotational motion via drive shafts 130 and 132, respectively, to the horizontal rotary incising blades 32A and 32B, respectively.

Figure 8:
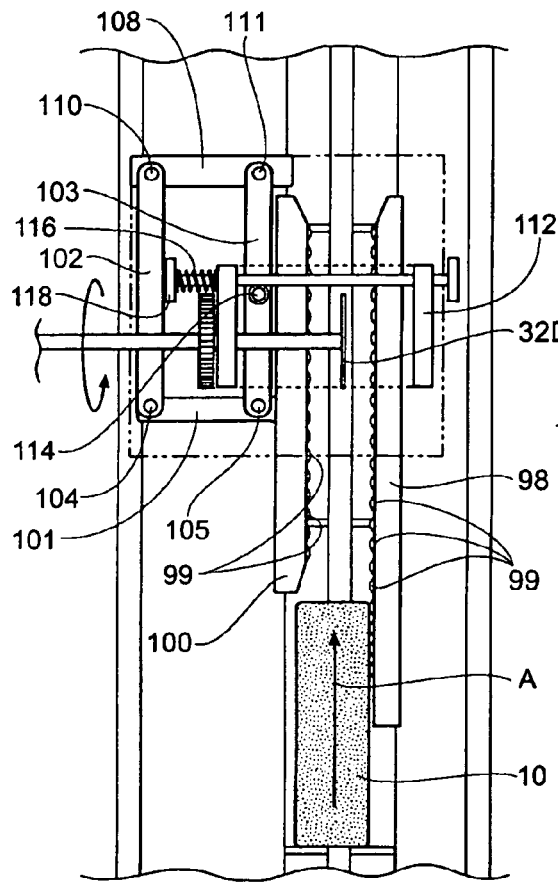
FIG. 8 is a fragmentary top plan view of the loaf incising apparatus illustrated in FIGS. 2-7, showing a cheese loaf moving in the direction of a vertically disposed incising blade.
Figure 9:
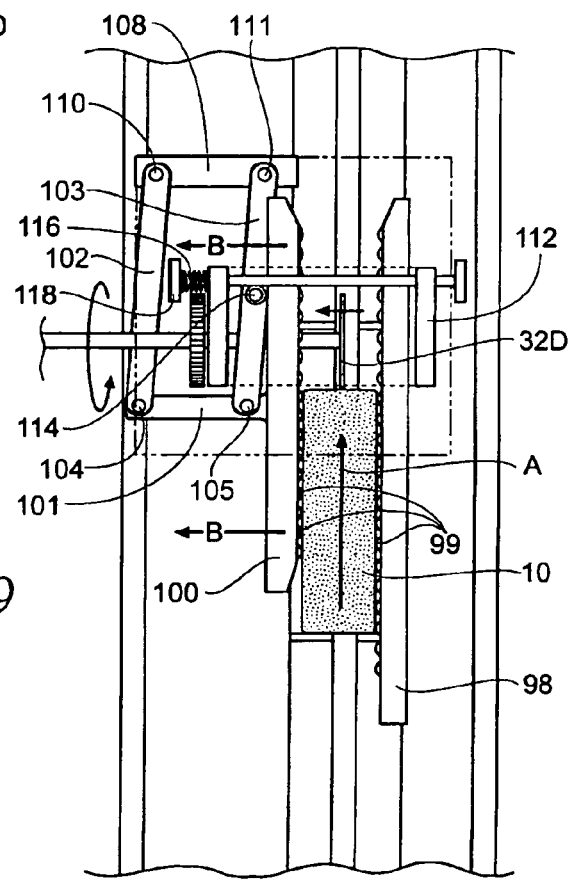
FIG. 9 is a fragmentary top plan view, similar to that of FIG. 8, showing a cheese loaf engaging a guide bar, thereby moving a centering mechanism and attached vertically disposed incising rotary blade to a predetermined position to incise the loaf at its midpoint.
Figure 10:
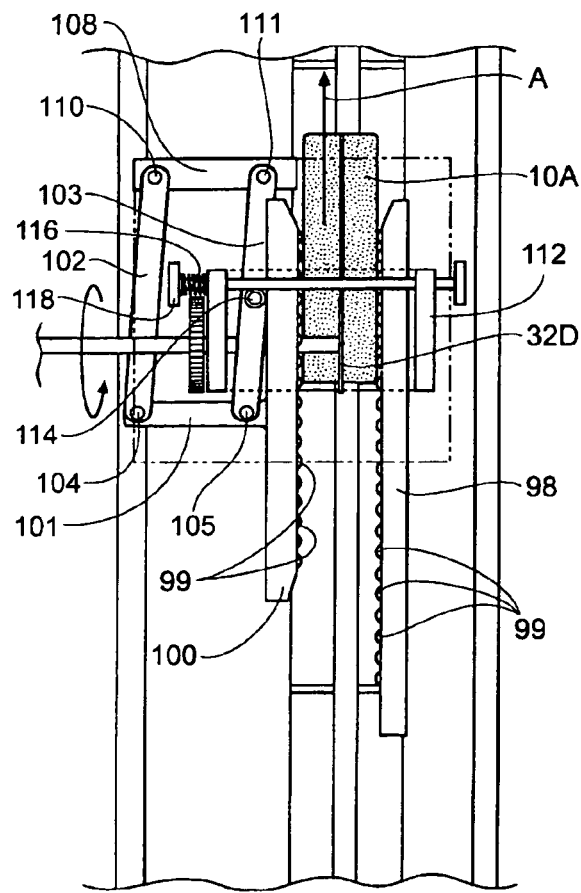
FIG. 10 is a fragmentary view, similar to those of FIGS. 8 and 9, showing the aligned incising blade partially incising a cheese loaf.
Figure 11:
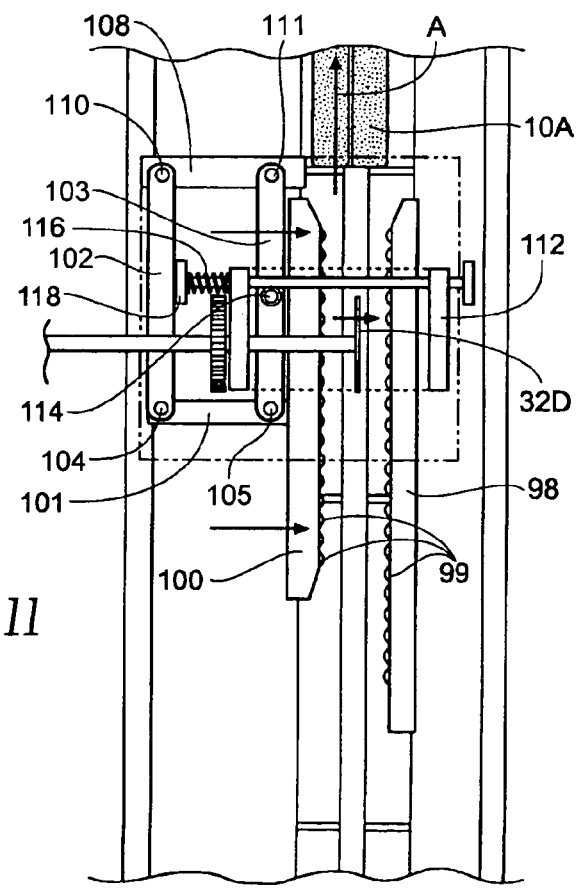
FIG. 11 is a fragmentary view, similar to those of FIGS. 8-10, showing the incised cheese loaf moving away from the incising blade with the centering mechanism returning to its first operating position.

Centering of the vertical rotary incising blades 32C and 32D may be understood with reference to FIGS. 8-11, with the rotary incising blade 32D being visible in these views. A parallelogram configuration, similar to the above-described configuration used to maintain centering of the horizontal rotary incising blades 32A and 32B, maintains centering of the vertical rotary incising blades 32C and 32D relative to a cheese loaf 10. As seen in FIG. 8, a cheese loaf 10 moves in the direction of the arrow A toward the vertical rotary incising blades 32C (not shown in FIG. 8) and 32D. A stationary rail 98 guides one side of the cheese loaf 10 as it approaches the rotary incising blades 32C and 32D.

An opposing movable rail 100 transmits width-aligning pressure to a mechanism for vertical blade centering of the vertical rotary incising blades 32C and 32D. The movable rail 100 is arranged to initially engage the other side of the incoming cheese loaf 10 moving in the direction of the arrow A and detect the width of the cheese loaf 10. As the cheese loaf 10 engages the movable rail 100, the movable rail 100 will be moved in the direction of the arrow B (shown in FIG. 9) to accommodate the width of the cheese loaf 10.

It should be noted that while the stationary rail 98 and the movable rail 100 may be of any length, in the preferred embodiment they are at least as long as the cheese loaves 10 which will be processed in the loaf incising apparatus 30 of the present invention. By making the stationary rail 98 and the movable rail 100 of sufficient size, it is ensured that they will contact and provide support for the cheese loaves 10 throughout the incising process. Further, and as illustrated in the figures, the stationary rail 98 and the movable rail 100 are preferably each supplied with a plurality of rollers 99 on the sides thereof which will face the cheese loaves 10, thereby reducing friction on the cheese loaves 10 as they move in the direction of the arrow A.

The movement of the movable rail 100 is translated to the vertical rotary incising blades 32C and 32D by mechanical linkages which will now be described. A laterally extending member 101 extends orthogonally from the side of the movable rail 100 on the side thereof opposite the side of the movable rail 100 which contacts the cheese loaves 10. A stationary support bar 108 is mounted on the table-like support 34 in spaced-away relationship to the laterally extending member 101 past the far end of the movable rail 100 where the cheese loaves 10 exit the incising process.

A first link member 102 is pivotally attached at one end thereof to the stationary support bar 108 at a pivot point 110 which is located at the end of the stationary support bar 108 nearest the edge of the table-like support 34. The other end of the first link member 102 is pivotally attached to the laterally extending member 101 at a pivot point 104 which is located at the distal end of the laterally extending member 101. A second link member 103 is pivotally attached at one end thereof to the stationary support bar 108 at a pivot point 111 which is located at the end of the stationary support bar 108 nearest the center of the table-like support 34. The other end of the second link member 103 is pivotally attached to the laterally extending member 101 at a pivot point 105 which is located near the proximal end of the laterally extending member 101 (the end which is connected to the movable rail 100).

It will be noted that the distance between the pivot point 110 and the pivot point 111 is approximately the same as the distance between the pivot point 104 and the pivot point 105. Likewise, the distance between the pivot point 104 and the pivot point 110 is approximately the same as the distance between the pivot point 105 and the pivot point 111. The relative positions of the linkages are thereby maintained in parallel relationship to provide a generally parallelogram configuration. This configuration is maintained as the movable rail 100 moves laterally to the left or right to accommodate larger or smaller cheese loaves 10.

A blade-positioning mechanism indicated generally by the reference numeral 112 is coupled to the second link member 103 at a pivot point 114. The pivot point 114 is located at a predetermined position intermediate the pivot point 105 and the pivot point 111. It is preferred that the pivot point 114 be positioned at a point halfway between the pivot point 105 and the pivot point 111 such that as the movable rail 100 is moved a predetermined lateral distance by the engagement of a cheese loaf 10, the blade positioning block 112 and the attached vertical rotary incising blades 32C and 32D are moved half the lateral distance, thereby centering the vertical rotary incising blades 32C and 32D relative to the cheese loaf 10.

As is further evident in FIGS. 8-11, the centering mechanism for the vertical rotary incising blades 32C and 32D is provided with an adjustable biasing mechanism including a coil spring 116 to return the centering mechanism to its initial position after the cheese loaf 10 has been fully incised. An axially movable threaded adjustment mechanism 118 is mounted on the blade-positioning mechanism and serves to adjust the initial compression of the coil spring 116.

With respect to the vertical rotary incising blades 32C and 32D and as seen particularly in FIG. 3, it may be observed that a flexible shaft 120, which is connected to the variable speed power source 92, drives a drive gear 122. As further seen in FIG. 3, the drive gear 122 is intermeshed with a mating gear 124, and the drive gear 122 and the mating gear 124 together transfer rotational motion via drive shafts to the vertical rotary incising blades 32C and 32D.

It will be understood by those skilled in the art that, while the centering mechanism for the horizontal rotary incising blades 32A and 32B and the vertical rotary incising blades 32C and 32D shown in the figures is preferred, other centering mechanisms may be utilized instead. Further, while four rotary incising blades 32A, 32B, 32C, and 32D represent the preferred embodiment, any number or arrangement of incising blades may be utilized depending on the number and arrangement of the planar incisions 18 desired.

Figure 13:
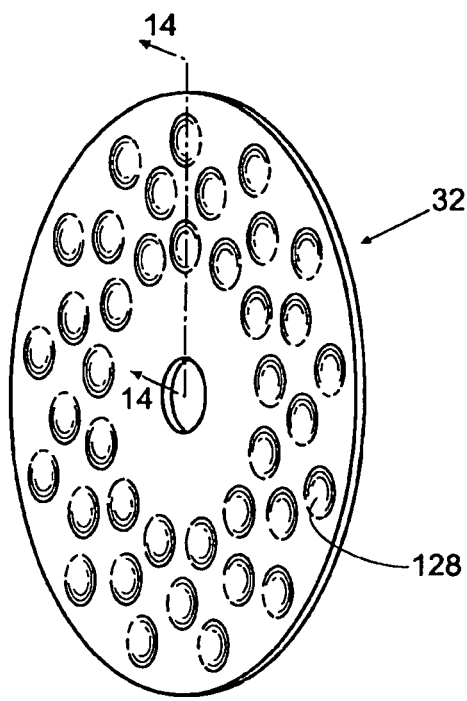
FIG. 13 is a perspective view of an incising blade of the type used with the loaf incising apparatus of the present invention.
Figure 14:
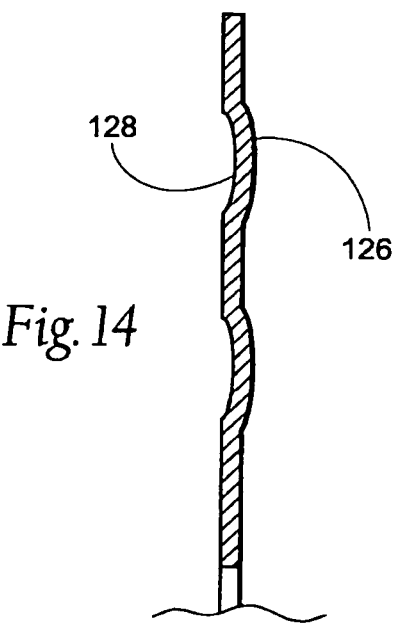
FIG. 14 is a cross section of the incising blade shown in FIG. 13 which is taken along the line 14-14.

Illustrated in FIGS. 13 and 14 is an example of a rotary incising blade 32 of the preferred embodiment which may be used in conjunction with the loaf incising apparatus 30 described herein. The preferred rotary incising blade 32 is fabricated from a waffled type or rigidized stainless steel material having a plurality of convex areas 126 and corresponding concave areas 128. This arrangement reduces friction on the cheese loaf 10 during the incising process. Further, since the rotary incising blades 32A, 32B, 32C, and 32D are powered by variable speed devices, as mentioned earlier, they may be driven at a speed somewhat faster than that of the conveyor 36. This feature, in conjunction with the convex areas 126 and the concave areas 128 allows the rotary incising blades 32A, 32B, 32C, and 32D to pull a cheese loaf 10 through the apparatus 30 during the incision process.

It may therefore be appreciated from the above detailed description of the preferred embodiment of the present invention that it facilitates the production of the smaller cheese segments which are increasingly desired by the consuming public. The smaller segment size cheese slices of the present invention may be manufactured on a large scale without experiencing the problems previously encountered in the manufacture of such small slice segments. The smaller segment size cheese slices of the present invention may be produced in any of a wide variety of different shapes which may be desired by the consuming public.

The smaller segment size cheese slices of the present invention are capable of manufacture on a large scale, fully automated production basis which does not require additional labor which would otherwise add significantly to the cost of manufacture. The smaller segment size cheese slices of the present invention are producible in precise and uniform sizes, thereby ensuring a high level of product quality suitable to a premium cheese product. The smaller segment size cheese slices of the present invention may be produced from standard size cheese loaves without requiring nonstandard sizes or resulting in waste.

The apparatus used to produce the cheese slices of the present invention is of a construction which is both dependable and durable, and it will also produce consistent product with little or no adjustment or maintenance required throughout its operating lifetime. The smaller size cheese slices of the present invention are also of manufacturing cost comparable to conventional cheese slices to enhance their market appeal and to thereby afford them the broadest possible market. Finally, all of the aforesaid advantages and objectives of the smaller cheese slices of the present invention are achieved without incurring any substantial relative disadvantage.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A method of producing a cheese slice product from a cheese loaf, said method comprising:
    cutting at least one longitudinal incision a distance into the exterior surface of the cheese loaf to thereby create a plurality of loaf segments which are joined together by at least one unslit portion; and
    slicing the cheese loaf in a direction perpendicular to the at least one longitudinal incision, wherein slicing the cheese loaf includes cutting completely through the cheese loaf with spaced apart cuts provided along the entire the length of the cheese loaf to provide a plurality of separated cheese slices arranged side-by-side in the longitudinal direction, each separated slice having a plurality of slice segments which are defined by said at least one longitudinal incision, said plurality of slice segments in each cheese slice being joined together by at least one attachment portion and separable from the remaining slice segments in each cheese slice;
    wherein said cheese slices may easily be separated into slice segments by a consumer without the need for a cutting tool.

2. A method as defined in claim 1, wherein each said at least one longitudinal incision comprises:
    a planar incision.

3. A method as defined in claim 1, wherein each of said plurality of loaf segments are of a similar cross-sectional configuration and size, and wherein each of said slice segments are of a similar configuration and size.

4. A method as defined in claim 1, wherein each of said plurality of loaf segments have an essentially rectangular cross section, and wherein each of said slice segments have an essentially rectangular configuration.

5. A method as defined in claim 1, wherein each of said plurality of loaf segments have an essentially square cross section, and wherein each of said slice segments have an essentially square configuration.

6. A method as defined in claim 1, wherein said cutting step comprises:
    cutting a plurality of longitudinal incisions into the cheese loaf to thereby create a plurality of loaf segments which are joined together by at least one unslit portion extending between adjoining pairs of loaf segments;
    wherein adjoining pairs of slice segments in each cheese slice are joined together by at least one attachment portion.

7. A method as defined in claim 6, wherein all of said longitudinal incisions are made in a first side of the cheese loaf.

8. A method as defined in claim 6, wherein said longitudinal incisions are made in at least two opposite sides of the cheese loaf.

9. A method as defined in claim 8, wherein there are multiple longitudinal incisions made in at least one of the two opposite sides of the cheese loaf.

10. A method as defined in claim 9, wherein said longitudinal incisions are in a consecutive sequence such that the longitudinal incisions made on a first side of the cheese loaf alternate with the longitudinal incisions made on a second side of the cheese loaf which is opposite the first side of the cheese loaf.

11. A method as defined in claim 1, wherein each said at least one longitudinal incision extends from a first side of the cheese loaf toward a second opposite side of the cheese loaf.

12. A method as defined in claim 11, wherein each said at least one longitudinal incision extends from the first side of the cheese loaf toward the second side of the cheese loaf more than halfway through the cheese loaf.

13. A method as defined in claim 11, wherein each said at least one longitudinal incision extends from the first side of the cheese loaf toward the second side of the cheese loaf less than halfway through the cheese loaf.

14. A method as defined in claim 13, additionally comprising:
   a corresponding longitudinal incision for each said at least one longitudinal incision extending from the first side of the cheese loaf toward the second side, said corresponding longitudinal incision extending from the second side of the cheese loaf toward the first side of the cheese loaf less than halfway through the cheese loaf.

15. A method as defined in claim 1, wherein said cutting operation automatically ensures that each of the loaf segments are of a similar cross-sectional configuration and size even if the size of the cheese loaf may vary somewhat, thereby ensuring that each of said slice segments produced from a given cheese loaf will be of a similar configuration and size.

16. A method as defined in claim 1, wherein said cutting step comprises:
   cutting a first pair of longitudinal incisions into the cheese loaf from a first pair of opposite sides of the cheese loaf, each of said first pair of longitudinal incisions ending short of a longitudinal centerline of the cheese loaf to define a first longitudinally-extending gap therebetween.

17. A method as defined in claim 16, wherein said first pair of longitudinal incisions defines at least one pair of loaf segments on opposite sides of said first pair of longitudinal incisions which are of approximately the said cross-sectional configuration and size.

18. A method as defined in claim 16, wherein said first pair of longitudinal incisions are each centrally located in the respective sides of the cheese loaf in which they are located.

19. A method as defined in claim 16, additionally comprising:
   cutting a second pair of longitudinal incisions into the cheese loaf from a second pair of opposite sides of the cheese loaf, each of said second pair of longitudinal incisions ending short of the longitudinal centerline of the cheese loaf to define a second longitudinally-extending gap therebetween, said first and second pairs of longitudinal incisions thereby creating four loaf segments which are joined together by an unslit portion located intermediate said first and longitudinally-extending gaps.

20. A method as defined in claim 19, wherein said first pair of longitudinal incisions are orthogonal to said second pair of longitudinal incisions.

21. A method as defined in claim 19, wherein said four loaf segments created by said first and second pairs of longitudinal incisions are of approximately the same cross-sectional configuration and size.

22. A method as defined in claim 19, wherein said first and second pairs of longitudinal incisions are each centrally located in the respective sides of the cheese loaf in which they are located.

23. A method of producing a cheese slice product from a cheese loaf, said method comprising
   cutting a plurality of longitudinal incisions into the cheese loaf to thereby create a plurality of loaf segments which are joined together by at least one unslit portion extending between adjoining pairs of loaf segments, each loaf segment being of a similar cross-sectional configuration and size; and
   slicing the cheese loaf, wherein slicing the cheese loaf includes cutting completely through the cheese loaf with spaced apart cuts provided along the entire the length of the cheese loaf to provide a plurality of separated cheese slices arranged side-by-side in the longitudinal direction, each separated slice having a plurality of slice segments which are defined by said plurality of longitudinal incisions, adjoining pairs of slice segments in each cheese slice being joined together by at least one attachment portion, each slice segment being of a similar configuration and size and separable from the remaining slice segments on the cheese slice;
wherein said cheese slices may easily be separated into slice segments by a consumer without the need for a cutting tool.

24. A method of producing a cheese slice product from a cheese loaf, said method comprising
   cutting a plurality of longitudinal incisions into the cheese loaf to thereby create at least three loaf segments which are joined together by at least one unslit portion which extends between adjoining pairs of loaf segments, each of said at least three loaf segments being of a similar cross-sectional configuration and size; and
   slicing the cheese loaf at an angle perpendicular to the plurality of longitudinal incisions, wherein slicing the cheese loaf includes cutting completely through the cheese loaf with spaced apart cuts provided along the entire the length of the cheese loaf to provide a plurality of separated cheese slices arranged side-by-side in the longitudinal direction, each slice having at least three slice segments which are defined by said plurality of longitudinal incisions, each of the cheese segments separable from the remaining two segments on the cheese slice, adjoining pairs of slice segments in each cheese slice being joined together by at least one attachment portion, said at least three slice segments being of a similar configuration and size;
wherein said cheese slices may easily be separated into slice segments by a consumer without the need for a cutting tool.

25. A method of producing a cheese slice product from a cheese loaf, said method comprising
   cutting a first pair of longitudinal incisions into the cheese loaf from a first pair of opposite sides of the cheese loaf, each of said first pair of longitudinal incisions ending short of a longitudinal centerline of the cheese loaf to define a first longitudinally-extending gap therebetween;
   cutting a second pair of longitudinal incisions into the cheese loaf from a second pair of opposite sides of the cheese loaf, each of said second pair of longitudinal incisions ending short of the longitudinal centerline of the cheese loaf to define a second longitudinally-extending gap therebetween, said first and second pairs of longitudinal incisions thereby creating four loaf segments which are joined together by an unslit portion located intermediate said first and second longitudinally-extending gaps; and transversely slicing the cheese loaf to into a plurality of cheese slices, wherein slicing the cheese loaf includes cutting completely through the cheese loaf with spaced apart cuts provided along the entire the length of the cheese loaf, wherein the slices are arranged in a side-by-side manner, each having four slice segments which are defined by said first and second pairs of longitudinal incisions, said four slice segments in each cheese slice being joined together by an attachment portion, each of the four slice segments separable from the remaining three slice segments on the cheese slice;

wherein said cheese slices may easily be separated into four slice segments by a consumer without the need for a cutting tool.

* * * * *

UNITED STATES PATENT AND TRADEMARK OFFICE
CERTIFICATE OF CORRECTION

PATENT NO. : 7,592,029 B1  Page 1 of 1
APPLICATION NO. : 10/857098
DATED : September 22, 2009
INVENTOR(S) : Linck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1069 days.

Signed and Sealed this

Twenty-first Day of September, 2010

David J. Kappos
*Director of the United States Patent and Trademark Office*